(12) United States Patent
Zhou et al.

(10) Patent No.: US 11,089,487 B2
(45) Date of Patent: Aug. 10, 2021

(54) CROSS-BAND QCL BEAM DETERMINATION

(71) Applicant: QUALCOMM Incorporated, San Diego, CA (US)

(72) Inventors: Yan Zhou, San Diego, CA (US); Tao Luo, San Diego, CA (US); Sony Akkarakaran, Poway, CA (US); Makesh Pravin John Wilson, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/261,084

(22) Filed: Jan. 29, 2019

(65) Prior Publication Data

US 2019/0239092 A1 Aug. 1, 2019

Related U.S. Application Data

(60) Provisional application No. 62/624,599, filed on Jan. 31, 2018.

(51) Int. Cl.
*H04W 16/28* (2009.01)
*H04B 7/024* (2017.01)
(Continued)

(52) U.S. Cl.
CPC .......... *H04W 16/28* (2013.01); *H04B 7/0408* (2013.01); *H04B 7/0626* (2013.01);
(Continued)

(58) Field of Classification Search
None
See application file for complete search history.

(56) References Cited

U.S. PATENT DOCUMENTS

2009/0121936 A1 5/2009 Maltsev et al.
2017/0288743 A1* 10/2017 Nam ................. H04L 5/0035
(Continued)

OTHER PUBLICATIONS

Huawei et al., "Beam Management Across Multiple Carriers", 3GPP Draft, R1-1704232, 3rd Generation Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017, Apr. 2, 2017 (Apr. 2, 2017), XP051242384, 5 Pages, Retrieved from the Internet: URL: http://www.3gpp.org/ftp/Meetings_3GPP_SYNC/RAN1/Docs/ [retrieved on Apr. 2, 2017].
(Continued)

*Primary Examiner* — Duc T Duong
(74) *Attorney, Agent, or Firm* — Michael J. DeHaemer, Jr.

(57) ABSTRACT

Methods, systems, and devices for wireless communication are described. A wireless device may identify a characteristic of a first beam associated with a first antenna array, determine a second beam associated with a second antenna array as a quasi-co-located beam with respect to the first beam based on the characteristic, and communicate on the first and second beams based on the determining. A base station may identify a user equipment (UE) searching for a connection with a secondary cell on a second frequency band, wherein the UE is served by the base station on a first frequency band and transmit an indicator to the UE to inform the UE regarding selection of a particular beam for measuring a reference signal from the secondary cell.

28 Claims, 12 Drawing Sheets

(51) Int. Cl.
*H04B 7/0408* (2017.01)
*H04W 24/10* (2009.01)
*H04W 72/04* (2009.01)
*H04L 5/00* (2006.01)
*H04B 7/06* (2006.01)
*H04L 25/02* (2006.01)
*H04B 7/08* (2006.01)
*H04B 7/0413* (2017.01)

(52) U.S. Cl.
CPC .......... *H04B 7/0695* (2013.01); *H04B 7/088* (2013.01); *H04L 5/0048* (2013.01); *H04L 25/0226* (2013.01); *H04W 24/10* (2013.01); *H04W 72/046* (2013.01); *H04W 72/0453* (2013.01); *H04B 7/0413* (2013.01)

(56) References Cited

U.S. PATENT DOCUMENTS

| | | | | |
|---|---|---|---|---|
| 2018/0041319 | A1* | 2/2018 | Cheng | H04L 5/0048 |
| 2018/0048413 | A1* | 2/2018 | Liu | H04W 48/18 |
| 2018/0083680 | A1* | 3/2018 | Guo | H04B 7/0626 |
| 2018/0227886 | A1* | 8/2018 | Chou | H04W 72/046 |
| 2019/0053312 | A1* | 2/2019 | Xia | H04W 72/046 |
| 2019/0074880 | A1* | 3/2019 | Frenne | H04B 7/0617 |
| 2019/0081740 | A1* | 3/2019 | Kaikkonen | H04W 72/0446 |
| 2019/0104477 | A1* | 4/2019 | Molavianjazi | H04L 5/0023 |
| 2019/0141691 | A1* | 5/2019 | Kwon | H04L 5/00 |
| 2019/0181941 | A1* | 6/2019 | Kim | H04B 7/088 |
| 2019/0356438 | A1* | 11/2019 | Lee | H04B 7/0408 |
| 2019/0364556 | A1* | 11/2019 | Davydov | H04L 5/005 |
| 2019/0373592 | A1* | 12/2019 | Ji | H04L 5/0048 |
| 2020/0014514 | A1* | 1/2020 | Gao | H04L 1/00 |
| 2020/0059398 | A1* | 2/2020 | Pan | H04L 41/0654 |
| 2020/0059951 | A1* | 2/2020 | Frenne | H04L 5/0023 |
| 2020/0221427 | A1* | 7/2020 | Nilsson | H04W 48/12 |
| 2020/0336194 | A1* | 10/2020 | Karjalainen | H04L 5/0044 |

OTHER PUBLICATIONS

Huawei et al., "Cross-Carrier Beam Management", 3GPP Draft, R1-1711410, 3rd Generation Partnership Project (3GPP), Mobile Competence Centre, 650, Route Des Lucioles, F-06921 Sophia-Antipolis Cedex, France, vol. RAN WG1, No. Qingdao, China, Jun. 27, 2017-Jun. 30, 2017, Jun. 26, 2017 (Jun. 26, 2017), XP051300598, 6 Pages, Retrieved from the Internet: URL:http://www.3gpp.org/ftp/Meetings_3GPP_SYNC/RAN1/Docs/ [retrieved on Jun. 26, 2017].

Huawei et al., "Details of QCL Assumptions and Related RS Design Considerations", 3GPP Draft, R1-1701697, 3rd Generation Partnership Project (3GPP), Mobile Competence Centre, 650, Route Des Lucioles, F-06921 Sophia-Antipolis Cedex, France, vol. RAN WG1, No. Athens, Feb. 13, 2017-Feb. 17, 2017, Feb. 12, 2017 (Feb. 12, 2017), XP051208863, 5 Pages, Retrieved from the Internet: URL:http://www.3gpp.org/ftp/Meetings_3GPP_SYNC/RAN1/Docs/ [retrieved on Feb. 12, 2017].

Huawei et al., "Details of QCL Assumptions and Related RS Design Considerations", 3GPP Draft, R1-1704239, 3rd Generation Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017, Apr. 2, 2017 (Apr. 2, 2017), XP051242391, 5 Pages, Retrieved from the Internet: URL:http://www.3gpp.org/ftp/Meetings_3GPP_SYNC/RAN1/Docs/ [retrieved on Apr. 2, 2017].

Intel Corporation: "Discussion on NR CSI Contents", 3GPP Draft, R1-1609523 Discussion on NR CSI Contents R3, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 1, 2016 (Oct. 1, 2016), XP051159593, 6 Pages, Retrieved from the Internet: URL: http://www.3gpp.org/ftp/tsg_ran/WG1_RL1/TSGR1_86b/Docs/ [retrieved on Oct. 1, 2016].

Intel Corporation: "Discussion on NR CSI Framework", 3GPP Draft, R1-1609521 Discussion on NR CSI Framework R2, 3rd Generation Partnership Project (3GPP), Mobile Competence Centre, 650, Route Des Lucioles, F-06921 Sophia-Antipolis Cedex, France, vol. RAN WG1, No. Lisbon, Portugal, Oct. 10, 2016-Oct. 14, 2016, Oct. 1, 2016 (Oct. 1, 2016), XP051159591, 5 Pages, Retrieved from the Internet: URL:http://www.3gpp.org/ftp/tsg_ran/WG1_RL1/TSGR1_86b/Docs/ [retrieved on Oct. 1, 2016].

International Search Report and Written Opinion—PCT/US2019/015835—ISA/EPO—dated Apr. 17, 2019.

* cited by examiner

CROSS-BAND QCL BEAM DETERMINATION

CLAIM OF PRIORITY

The present Application for patent claims priority to Provisional Application No. 62/624,599 entitled "CROSS-BAND QCL BEAM DETERMINATION" filed Jan. 31, 2018 and assigned to the assignee hereof and hereby expressly incorporated by reference herein.

BACKGROUND

The following relates generally to wireless communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, or apparatuses that support cross-band quasi-co-located (QCL) beam determination.

A method of wireless communication is described. The method may include identifying a characteristic of a first beam associated with a first antenna array, determining a second beam associated with a second antenna array as a quasi-co-located beam with respect to the first beam based on the characteristic, and communicating on the first and second beams based on the determining.

An apparatus for wireless communication is described. The apparatus may include a processor, a memory in electronic communication with the processor, and instructions stored in the memory. The instructions may be executable by the processor to cause the apparatus to identify a characteristic of a first beam associated with a first antenna array, determine a second beam associated with a second antenna array as a quasi-co-located beam with respect to the first beam based on the characteristic, and communicate on the first and second beams based on the determining.

A non-transitory computer readable medium storing code for wireless communication is described. The code may include instructions executable by a processor to identify a characteristic of a first beam associated with a first antenna array, determine a second beam associated with a second antenna array as a quasi-co-located beam with respect to the first beam based on the characteristic, and communicate on the first and second beams based on the determining.

Another apparatus for wireless communication is described. The apparatus may include means for identifying a characteristic of a first beam associated with a first antenna array, means for determining a second beam associated with a second antenna array as a quasi-co-located beam with respect to the first beam based on the characteristic, and means for communicating on the first and second beams based on the determining.

In some examples of the method, apparatuses, or non-transitory computer-readable medium described herein, the first antenna array is associated with analog beams and the second antenna array is associated with digital beams. In some instances, the first antenna array is associated with a first frequency band and the second antenna array is associated with a second frequency band. In some instances, the characteristic comprises at least one of a radiation pattern, a peak beam direction, or a received power of the first beam. In some instances, the determining comprises adjusting beam weights of the second beam to substantially match the radiation pattern of the first beam and designating the second beam as a cross-band quasi-co-located beam with respect to the first beam. In some instances, the determining comprises determining the second beam having a phased array beam steering with a steered direction most aligned with the peak beam direction of the first beam relative to other beams associated with the second antenna array and designating the second beam as a cross-band quasi-co-located beam with respect to the first beam. In some cases, the received power is higher than received power of other beams associated with the first antenna array and higher than a threshold power.

In some instances, the determining comprises sending a request on a first frequency band to a base station for a training signal on a second frequency band with a second frequency band transmit beam matching a beam pattern and peak beam direction of a first frequency band transmit beam, receiving the training signal, determining the second beam having a phased array beam steering with a steered direction such that a received power of the second beam is higher than other beams associated with the second antenna array, and designating the second beam as a cross-band quasi-co-located beam with respect to the first beam. Some examples of the method, apparatuses, or non-transitory computer-readable medium described herein may further include processes, features, means, or instructions for iteratively sending requests to at least one different base station for training signals to determine the second beam. Some examples of the method, apparatuses, or non-transitory computer-readable medium described herein may further include processes, features, means, or instructions for determining, for each beam associated with the first antenna array, at least one quasi-co-located beam associated with the second antenna array based on a characteristic of each beam. Some examples of the method, apparatuses, or non-transitory computer-readable medium described herein may further include processes, features, means, or instructions for identifying a change in form factor of a wireless device containing the first and second antenna arrays and determining, for at least one beam associated with the first antenna array, at least one different quasi-co-located beam associated with the second antenna array in response to the change in form factor.

Some examples of the method, apparatuses, or non-transitory computer-readable medium described herein may further include processes, features, means, or instructions for receiving an indicator to measure a reference signal via a quasi-co-located beam with respect to the first beam and measuring the reference signal on the second beam based on the indicator. In some instances, the first beam is a beam having received power that is higher than received power of other beams associated with the first antenna array. Some examples of the method, apparatuses, or non-transitory computer-readable medium described herein may further include processes, features, means, or instructions for receiving a request to report a beam identification of the first beam, reporting the beam identification of the first beam, and receiving an indicator to measure a reference signal on a beam quasi-co-located with respect to the first beam having the beam identification. In some cases, the beam identification comprises an identification number of a synchronization signal block (SSB), a channel state information reference signal (CSI-RS), or a sounding reference signal (SRS). Some examples of the method, apparatuses, or non-transitory computer-readable medium described herein may further include processes, features, means, or instructions for receiving a transmit beam identification indicating a beam used for transmission on a frequency band associated with the first antenna array, identifying the second beam associated with the second antenna array and quasi-co-located with respect to a receive beam corresponding to the transmit beam identification, and measuring a reference signal using the second beam.

A method of wireless communication performed by a base station is described. The method may include identifying a user equipment (UE) searching for a connection with a secondary cell on a second frequency band, wherein the UE is served by the base station on a first frequency band and transmitting an indicator to the UE to inform the UE regarding selection of a particular beam for measuring a reference signal from the secondary cell.

An apparatus for wireless communication is described. The apparatus may include a processor, a memory in electronic communication with the processor, and instructions stored in the memory. The instructions may be executable by the processor to cause the apparatus to identify a user equipment (UE) searching for a connection with a secondary cell on a second frequency band, wherein the UE is served by a base station on a first frequency band and transmit an indicator to the UE to inform the UE regarding selection of a particular beam for measuring a reference signal from the secondary cell.

A non-transitory computer readable medium storing code for wireless communication is described. The code may include instructions executable by a processor to identify a user equipment (UE) searching for a secondary cell connection on a second frequency band, wherein the UE is served by a base station on a first frequency band and transmit an indicator to the UE to inform the UE regarding selection of a particular beam for measuring a reference signal from the secondary cell.

An apparatus for wireless communication is described. The apparatus may include means for identifying a user equipment (UE) searching for a secondary cell connection on a second frequency band, wherein the UE is served by a base station on a first frequency band and means for transmitting an indicator to the UE to inform the UE regarding selection of a particular beam for measuring a reference signal from the secondary cell.

In some instances, the secondary cell is co-located with the base station. Some examples of the method, apparatuses, or non-transitory computer-readable medium described herein may further include processes, features, means, or instructions for signaling the secondary cell to transmit reference signals in a direction aligned with a transmit beam used to transmit the indicator or with the particular beam. In some instances, the indicator comprises an instruction to measure the reference signal in a direction substantially aligned with a receive beam used to receive transmissions from the base station on the first frequency band. In some instances, the indicator comprises a beam identification number of a receive beam used to receive transmissions from the base station on the first frequency band. Some examples of the method, apparatuses, or non-transitory computer-readable medium described herein may further include processes, features, means, or instructions for requesting the UE to report the beam identification number. In some cases, the indicator comprises a beam identification number of a transmit beam used to send transmissions from the base station to the UE on the first frequency band. In some cases, the indicator is included in a reference signal measurement configuration transmission to the UE.

DETAILED DESCRIPTION

Figure 1:
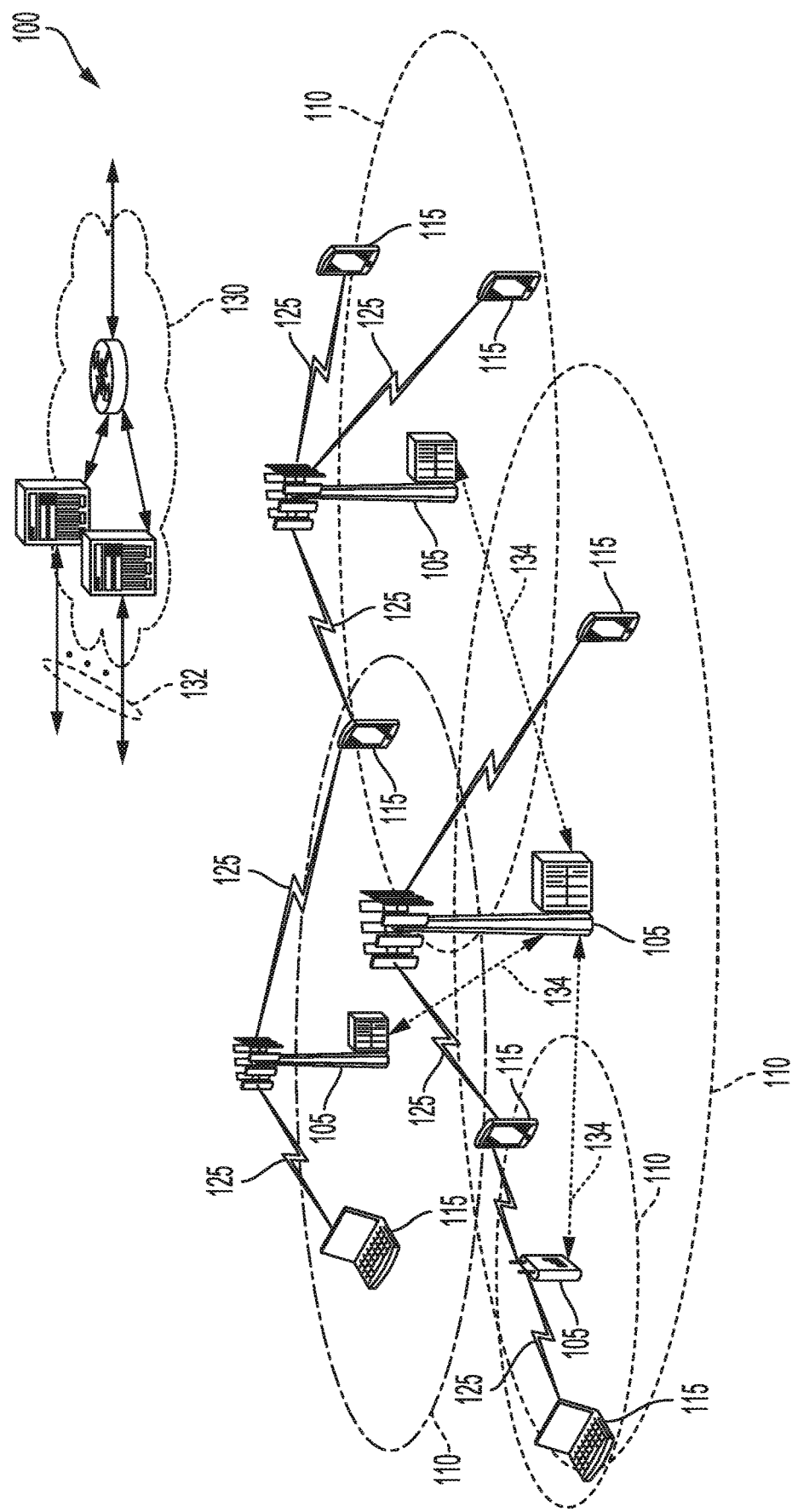
FIG. 1 illustrates an example of a system for wireless communication that supports cross-band quasi-co-located (QCL) beam determination in accordance with aspects of the present disclosure.

Wireless devices may use multiple antenna arrays for communications on different frequency bands. A user equipment (UE), for example, may dedicate a first antenna array to a frequency band below 6 GHz (sub-6 band) and a second antenna array to a different frequency band, such as a millimeter wave (mmW) band (e.g., 60 GHz). In some instances, if a base station (e.g., gNB) serving the UE on the frequency band used by the first antenna array is co-located with a second base station serving the UE on the frequency band used by the second antenna array, the UE may benefit from determining which beam(s) associated with antenna(s) in the first antenna array correspond with beam(s) associated with antenna(s) in the second antenna array in terms of similarity in beam pattern and direction. This is known as determination of cross-band quasi-co-located (QCL) beams, and a UE with known cross-band QCL beams may use information related to one set of beams on one frequency band to determine the ideal beams from a second set of beams to use for communications on a second frequency band, resulting in power savings and increased operational efficiency.

In some instances, however, the antenna distribution for different antenna arrays may be distributed differently across the UE. Further, each antenna array may have different numbers of antennas. The arrangement and configuration of antennas in different antenna arrays may be based in part on the type of antennas and the frequency band in which the antenna array is intended to operate. In some examples, antenna elements in a first array that are used for sub-6 communications may be distributed at different locations of the UE and form digital beams (e.g., beam weights are dynamically computed based on certain metrics), while antenna elements in a second array used for mmW communications may form analog beams. Accordingly, the distribution, number, and types of beams formed by antenna arrays for different bands may have different shapes and widths, making it difficult for the UE to determine which beams associated with a first antenna array are cross-band QCL with beams associated with a second antenna array.

In order to determine cross-band QCL beams for two example beam sets, in some instances, for each beam in a first beam set, a corresponding beam pattern is computed for beam(s) of a second beam set that most closely aligns with the beam pattern for each beam in the first beam set. In another example, for each beam in the first beam set, a corresponding peak beam direction is computed for beam(s) of the second beam set that most closely aligns with the peak beam direction for each beam in the first beam set. In some instances, a UE and base station may coordinate efforts to determine cross-band QCL beam sets at the UE, such as by the UE requesting the base station to send training signals on one frequency band using particular beams that are most likely to align with an ideal predetermined beam on a different frequency band. The cross-band QCL beam determination may further be refined, such as by performing the training operations with multiple base stations to filter out variations that may be a function of the propagation environment. The training operations may also be dynamically repeated in response to changes in antenna arrangement, such as changes in form-factor configurations (e.g., bendable or folding devices).

The determination of cross-band QCL beams for a UE may have benefits including improved operational efficiency, extended range, and reduced power consumption. In one example, a UE may typically perform a beam sweeping procedure where it turns on multiple receive beams in all directions in order to receive reference signals from a base station, especially if the UE is not aware of the arrival angle of the reference signals. Likewise, the base station may need to send reference signals in multiple directions if it does not know the direction at which the UE will receive the reference signals. As described further herein, the base station and UE may use information gathered from beam management procedures regarding ideal transmit and receive beams for a frequency band associated with one base station to coordinate beam patterns and directions for reference signals sent by a co-located base station on other frequency bands. The coordination of reference signal via certain beams may reduce beam sweep overhead and allow for extended range with narrower beams in a particular direction.

Aspects of the disclosure are initially described in the context of a wireless communications system. Aspects of the disclosure are further illustrated by and described with reference to apparatus diagrams, system diagrams, and flowcharts that relate to cross-band QCL determination and application, including for initial beam selection. The detailed description set forth below, in connection with the appended drawings and appendix, is intended as a description of various configurations and is not intended to limit the scope of the disclosure. Rather, the detailed description includes specific details for the purpose of providing a thorough understanding of the present disclosure. It will be apparent to those skilled in the art that these specific details are not required in every case and that, in some instances, well-known structures and components are shown in block diagram form for clarity of presentation.

This disclosure relates generally to determining cross-band QCL beams from different sets of beams where the different beam sets may be used for communication on different frequency bands with co-located base stations. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP Long Term Evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of a new radio (NR) technology. The 5G NR will be capable of scaling to provide coverage (1) to a massive Internet of things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth, for example. For other various indoor wideband implementations, using a TDD over the unlicensed portion of the 5 GHz band, the subcarrier spacing may occur with 60 kHz over a 160 MHz bandwidth, for example. Finally, for various deployments transmitting with mmWave components at a TDD of 28 GHz, subcarrier spacing may occur with 120 kHz over a 500 MHz bandwidth, for example. Other deployments of different subcarrier spacing over different bandwidths are also within the scope of the present disclosure.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs may allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 illustrates an example of a wireless communications system 100 that supports cross-band QCL determination and application in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internetof-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115 (e.g., for multiple-input multiple-output (MIMO) operations such as spatial multiplexing, or for directional beamforming). However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ LTE License Assisted Access (LTE-LAA) or LTE-Unlicensed (LTE-U) radio access technology or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band. Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some cases, the antennas of a base station 105 or UE 115 may be located within one or more antennas or antenna arrays, which may support MIMO operations such as spatial multiplexing, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. The UE 115 may use beams associated with a first antenna array for communications on a first frequency band and beams associated with a second antenna array for communications on a second frequency band. Determining which beams associated with the first antenna array are cross-band QCL with respect to beams associated with the second antenna array may improve communication efficiency and power consumption when the base stations 105 serving the UE 115 for the two frequency bands are co-located.

MIMO wireless systems use a transmission scheme between a transmitting device (e.g., a base station 105) and a receiving device (e.g., a UE 115), where both transmitting device and the receiving device are equipped with multiple antennas. MIMO communications may employ multipath signal propagation to increase the utilization of a radio frequency spectrum band by transmitting or receiving different signals via different spatial paths, which may be referred to as spatial multiplexing. The different signals may, for example, be transmitted by the transmitting device via different antennas or different combinations of antennas. Likewise, the different signals may be received by the receiving device via different antennas or different combinations of antennas. Each of the different signals may be referred to as a separate spatial stream, and the different antennas or different combinations of antennas at a given device (e.g., the orthogonal resource of the device associated with the spatial dimension) may be referred to as spatial layers.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a direction between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain phase offset, timing advance/delay, or amplitude adjustment to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may multiple use antennas or antenna arrays to conduct beamforming operations for directional communications with a UE 115. For instance, signals may be transmitted multiple times in different directions, which may include a signal being transmitted according to different beamforming weight sets associated with different directions of transmission. A receiving device (e.g., a UE 115, which may be an example of a mmW receiving device) may try multiple receive beams when receiving various signals from the base station 105, such as synchronization signals or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds ($Tf=307200*Ts$). The radio frames may be identified by a system frame number (SFN) ranging from 0 to 1023. Each frame may include ten subframes numbered from 0 to 9, and each subframe may have a duration of 1 millisecond. A subframe may be further divided into two slots each having a duration of 0.5 milliseconds, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols and in some instances, a symbol of a mini-slot or a mini-slot may be the smallest unit of scheduling. Each symbol may vary in duration depending on the subcarrier spacing or frequency band of operation, for example. Some wireless communications systems may implement slot aggregation in which multiple slots or mini-slots may be aggregated together for communication between a UE 115 and a base station 105.

A resource element may consist of one symbol period (e.g., a duration of one modulation symbol) and one sub-carrier (e.g., a 15 kHz frequency range). A resource block may contain 12 consecutive subcarriers in the frequency domain (e.g., collectively forming a "carrier") and, for a normal cyclic prefix in each orthogonal frequency-division multiplexing (OFDM) symbol, 7 consecutive OFDM symbol periods in the time domain (1 slot), or 84 total resource elements across the frequency and time domains. The number of bits carried by each resource element may depend on the modulation scheme (the configuration of modulation symbols that may be applied during each symbol period). Thus, the more resource elements that a UE 115 receives and the higher the modulation scheme (e.g., the higher the number of bits that may be represented by a modulation symbol according to a given modulation scheme), the higher the data rate may be for the UE 115. In MIMO systems, a wireless communications resource may refer to a combination of a radio frequency spectrum band resource, a time resource, and a spatial resource (e.g., spatial layers), and the use of multiple spatial layers may further increase the data rate for communications with a UE 115.

The term "carrier" refers to a set of radio frequency spectrum resources having a defined organizational structure for supporting uplink or downlink communications over a communication link 125. For example, a carrier of a communication link 125 may include a portion of a radio frequency spectrum band that may also be referred to as a frequency channel. In some examples a carrier may be made up of multiple sub-carriers (e.g., waveform signals of multiple different frequencies). A carrier may be organized to include multiple physical channels, where each physical channel may carry user data, control information, or other signaling.

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, or 20 MHz). In some examples the system bandwidth may refer to a minimum bandwidth unit for scheduling communications between a base station 105 and a UE 115. In other examples a base station 105 or a UE 115 may also support communications over carriers having a smaller bandwidth than the system bandwidth. In such examples, the system bandwidth may be referred to as "wideband" bandwidth and the smaller bandwidth may be referred to as a "narrowband" bandwidth. In some examples of the wireless communications system 100, wideband communications may be performed according to a 20 MHz carrier bandwidth and narrowband communications may be performed according to a 1.4 MHz carrier bandwidth.

Devices of the wireless communications system 100 (e.g., base stations or UEs 115) may have a hardware configuration that supports communications over a particular carrier bandwidth, or may be configurable to support communications over one of a set of carrier bandwidths. For example, base stations 105 or UEs 115 may perform some communications according to a system bandwidth (e.g., wideband communications), and may perform some communications according to a smaller bandwidth (e.g., narrowband communications). In some examples, the wireless communications system 100 may include base stations 105 and/or UEs that can support simultaneous communications via carriers associated with more than one different bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may use a combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As depicted in FIG. 1, a UE 115 may communicate over wireless communication links 125 with multiple gNBs 105 using different frequency bands. For example, the UE 115 may communicate on a sub-6 band using digital beams from a first antenna array and on a mmW band using analog beams from a second antenna array. In some instances, the gNB 105 serving the UE 115 on the sub-6 band is co-located with the gNB 105 serving the UE 115 on the mmW band. The UE 115 may determine the beams for the sub-6 band that are cross-band QCL with beams for the mmW band using beam management procedures described further herein. In some instances, the UE 115 may send a request across communication link 125 to the gNB 105 for the gNB 105 to send training signals to assist the UE 115 in determination of cross-band QCL beams. Other procedures are also described herein for determining and applying cross-band QCL beams.

Figure 2:
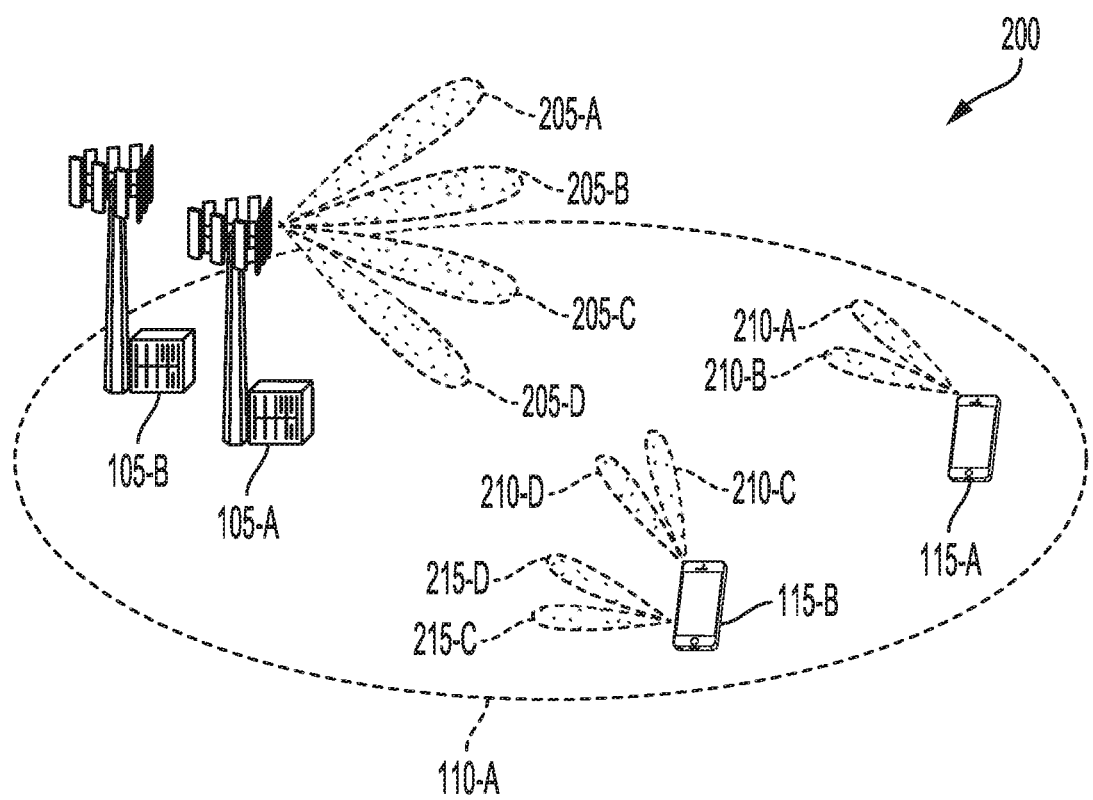
FIG. 2 illustrates an example system that supports cross-band QCL beam determination in accordance with aspects of the present disclosure.

FIG. 2 illustrates a wireless communication system 200 that supports determination and application of cross-band QCL beams in accordance with various aspects of the present disclosure. As seen in FIG. 2, gNB 105-A may use multiple transmit and/or receive beams 205 to communicate with UEs 115 within its geographical coverage area 110-A. The UEs 115 may similarly use multiple transmit/receive beams 210 to communicate with the gNB 105-A. In some cases, each of the transmit beams 205 sent by gNB 105-A may be in a different direction. Accordingly, certain beams (e.g., 205-A and 205-B) sent by the gNB 105-A will be more suited for one UE 115-A while other beams (e.g., 205-C and 205-D) sent by the gNB 105-A will be better suited for another UE 115-B, depending on the direction of the transmit beams and the location of the receiving UE 115 relative to those beams. Further, each UE 115 may use different receive beams 210 to receive transmissions from the gNB 105-A. The receive beams 210 that are more closely aligned with the direction of the transmit beams 205 from the gNB 105-A will be more ideal for receiving those transmissions. For example, a UE 115-B may determine that beam 210-D is most ideal for receiving transmit beam 205-D based on determining that the received power on receive beam 210-D is greater than received power on other receive beams at the UE 115-B.

The UE 115-B and gNB 105-A may perform training procedures to determine the appropriate transmit/receive beams 210 and 205 for communication between UE 115-B and gNB 105-A. In some instances, the UE 115-B may use a second set of beams 215 for communication on a different frequency band with a different gNB 105-B. Here, the UE 115-B may need to perform beam training procedures similar to those used for the first set of beams 210 to determine which of the second set of beams 215 is ideally used for communication with gNB 105-B. Likewise, gNB 105-B may need to perform beam sweeping procedures to send synchronization signals and the like in multiple directions to cover UEs 115 within its geographical coverage area, and/or perform beam training procedures to locate the ideal beams for communication with known UEs 115.

In some instances, however, gNB 105-B may be co-located with gNB 105-A. Accordingly, the transmit and receive beams used by the gNBs 105 for communication with a particular UE 115 may have similar angle of arrival, signal strength, and other similar characteristics. As such, the UE 115 may determine which beams from the first set of beams 210 are cross-band QCL with respect to beams from the second set of beams 215, as described in further detail herein, to reduce overhead signaling and beam training resources.

Figure 3:
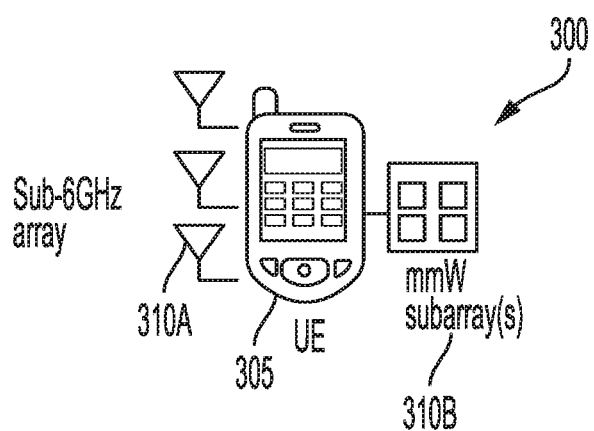
FIG. 3 illustrates antenna arrays of an example device that supports cross-band QCL beam determination in accordance with aspects of the present disclosure.

FIG. 3 shows an example antenna configuration 300 of a wireless device 305 that supports cross-band QCL determination in accordance with aspects of the present disclosure. The wireless device 305 may be a UE 115 or a base station 105 with multiple antenna arrays. The wireless device 305 may use different antenna arrays for communications on different frequency bands. For example, the wireless device 305 may have a first antenna array 310A that is used for communications on a sub-6 band while a second antenna array 310B is used for communications on a mmW band. The antenna elements for the antenna arrays 310 may be distributed at different locations throughout the wireless device 305, and the first antenna array 310A may have different number of antennas compared to the second antenna array 310B. Further, communications on different frequency bands may, in some instances, require different types of beams. For example, the first antenna array 310A for communication on the sub-6 band may form digital beams, where the beam weights are dynamically computed based on certain metrics. The second antenna array 310B for communication on the mmW band, however, may form analog beams, where the beam weights are pre-configured and common across the operation band. Various limitations associated with communications on the mmW band may mean analog beams are better suited for mmW communications. Accordingly, the formed beams associated with the first antenna array 310A may have different shapes and widths compared to formed beams associated with the second antenna array 310B.

Figure 4:
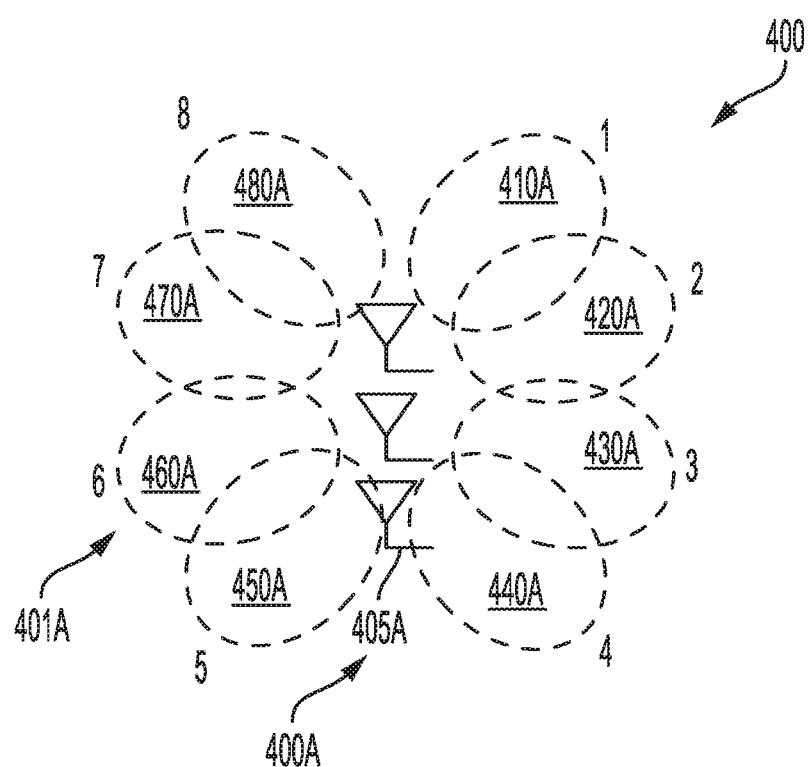
FIG. 4 illustrates example sets of beams formed by different antenna arrays of a wireless device that supports cross-band QCL beam determination in accordance with aspects of the present disclosure.
Figure 4:
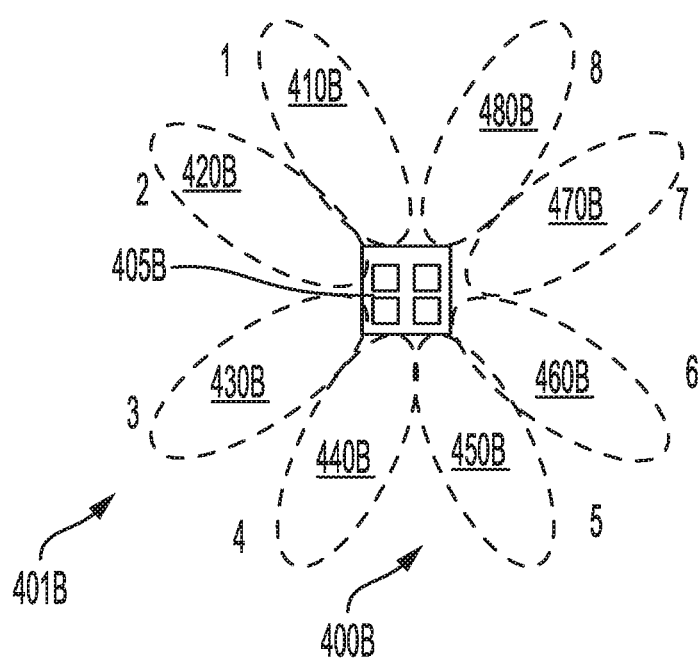

FIG. 4 depicts example sets of beams 400 formed by different antenna arrays 405 of a wireless device such as UE 115 or base station 105. As seen in FIG. 4, a wireless device 305 may use a first antenna array 405A to communicate on a sub-6 frequency band and a second antenna array 405B to communicate on a mmW frequency band. In the illustrated example, the first antenna array 405A may form digital beams 410A-480A for communication on the sub-6 band. The second antenna array 405B may form analog beams 410B-480B for communication on the mmW band. Although FIG. 4 shows antenna arrays 405A and 405B having a same number of beams allowing a one-to-one cross-band QCL mapping between the beam sets, different numbers of beams for the two antenna arrays 405A and 405B are also possible. Further, the two beam sets may be used for communication on different bands within the same frequency range (e.g., both beam sets operating in sub-6 bands or in mmW bands).

The wireless device 305 may determine which beams from the first beam set 400A are cross-band QCL with respect to beams from the second beam set 400B. The cross-band QCL mapping may help determine which beams from the two beam sets 400A and 400B are most ideal for communication on different frequency bands if the arriving or transmitted signal have similar angle of arrival or transmission. In the illustrated example, for a given analog beam set 400B, the wireless device 305 may determine a mapping with digital beam set 400A such that the best beam in set 400B can indicate the best beam in set 400A for arriving signals having the same arrival angle, and vice versa. For example, the wireless device 305 may be a UE 115 that receives a signal 401B on the mmW band with a particular angle of arrival as shown in FIG. 4. If the UE 115 has determined the cross-band QCL mapping between the beam sets 400A and 400B, the incoming signal 401B received via beam 430B may indicate the appropriate beam 460A to use for receiving an incoming signal 401A having a similar angle of arrival on the sub-6 band, if the signals 401A and 401B are transmitted by co-located base stations. Accordingly, the UE 115 may reduce beam training overhead and power consumption with the cross-band QCL mapping.

Various procedures for determining cross-band QCL mapping are within the scope of the present disclosure. In some instances, the wireless device 305 may determine and configure cross-band QCL beams based on matching beam patterns. In the illustrated example, for each analog beam in beam set 400B of UE 115, a corresponding digital beam pattern may be computed that most closely matches the analog beam pattern. The computed digital beams that substantially match different analog beams in beam set 400B will form beam set 400A. In some instances, the radiation pattern of a given analog beam is measured, e.g., in a chamber. The beam weights of the digital beam are adjusted such that the radiation pattern of the digital beam substantially match the analog beam pattern, e.g., by minimizing the maximum gap between the analog and beam patterns. The analog beam and the digital beam having a beam pattern that most closely matches the pattern of the analog beam are then recorded or designated as cross-band QCL mapped.

Alternatively, or in addition, the cross-band QCL mapping may be determined based on peak beam directions. In the illustrated example, for each analog beam in beam set 400B of UE 115, a corresponding digital beam having a peak direction that substantially aligns with that of the analog beam is determined. In some instances, the radiation pattern of a given analog beam is measured, and the peak beam direction of the beam is identified. The phased array beam steering with the steered direction aligned with the analog beam is the corresponding digital beam. The analog beam and the digital beam having peak beam direction most aligned with the peak beam direction of the analog beam are then recorded or designated as cross-band QCL mapped.

In some instances, a base station 105 and UE 115 may coordinate efforts to determine cross-band QCL beams, such as through over-the-air procedures without the need of offline calibration. For example, a UE 115 may request a base station 105 to assist the UE 115 in computing a digital beam that most closely matches an analog beam, as illustrated in FIGS. 5A-5C.

Figure 5A:
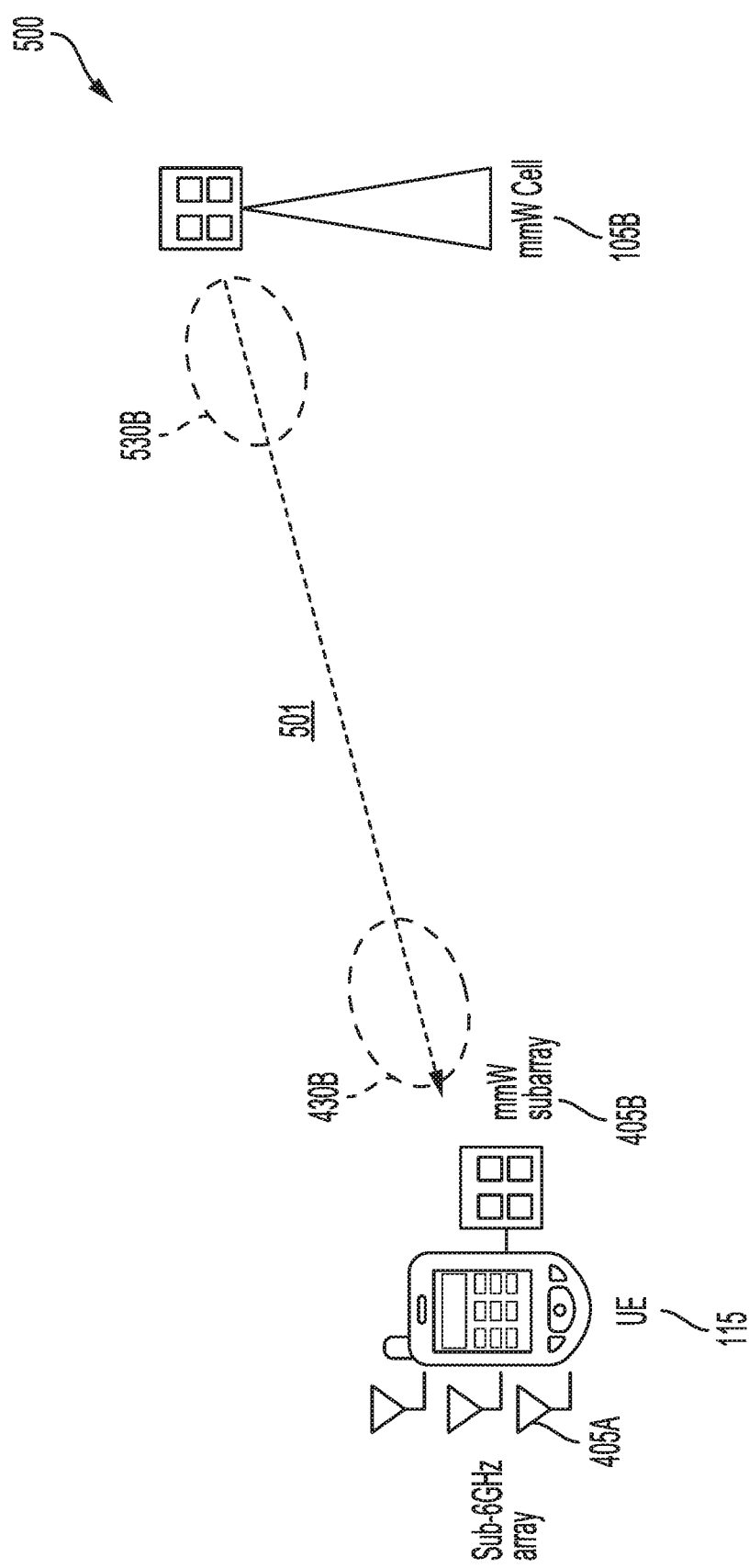
FIGS. 5A-5C illustrate operations conducted in an example system for determining cross-band QCL beams in accordance with aspects of the present disclosure.
Figure 5B:
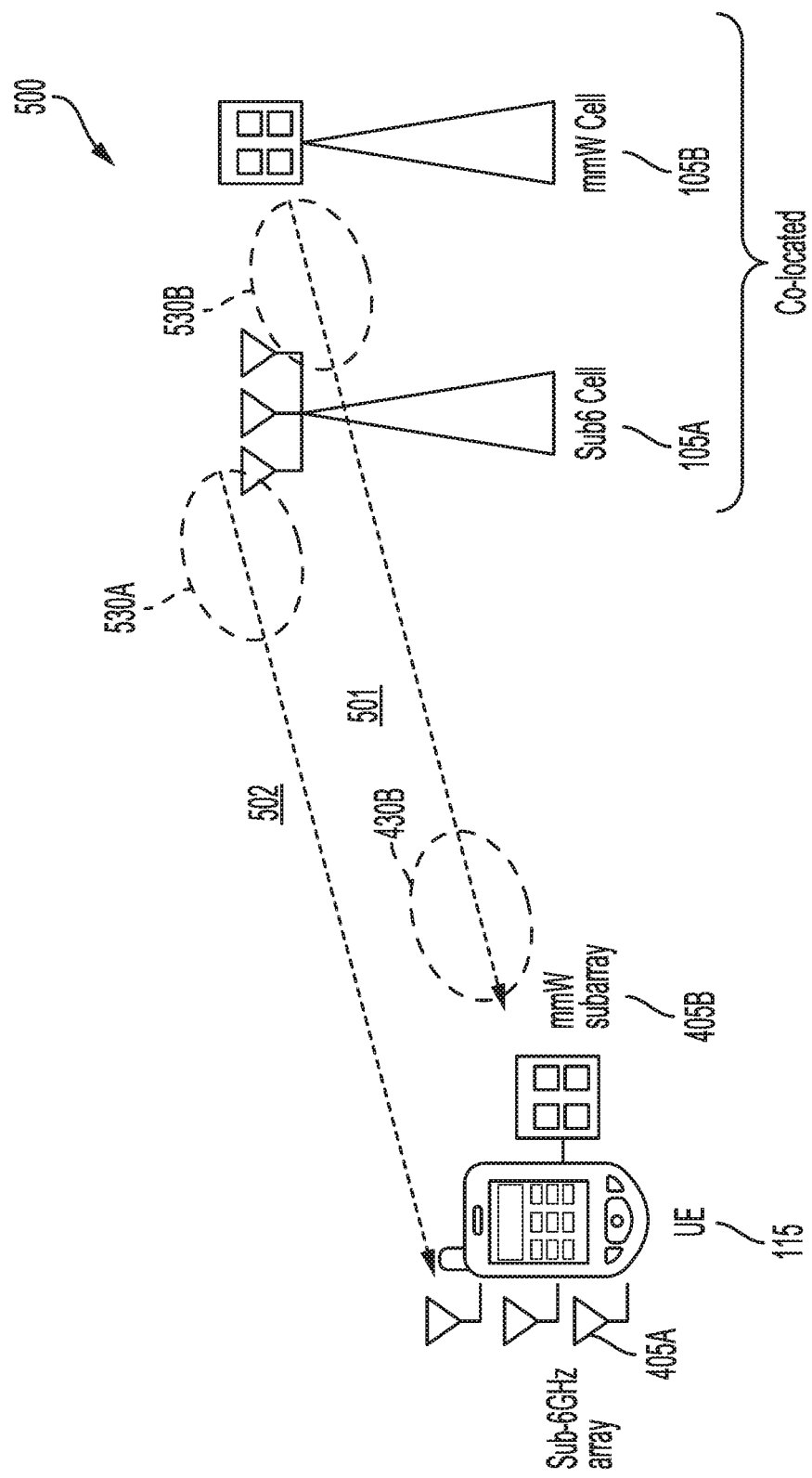
Figure 5C:
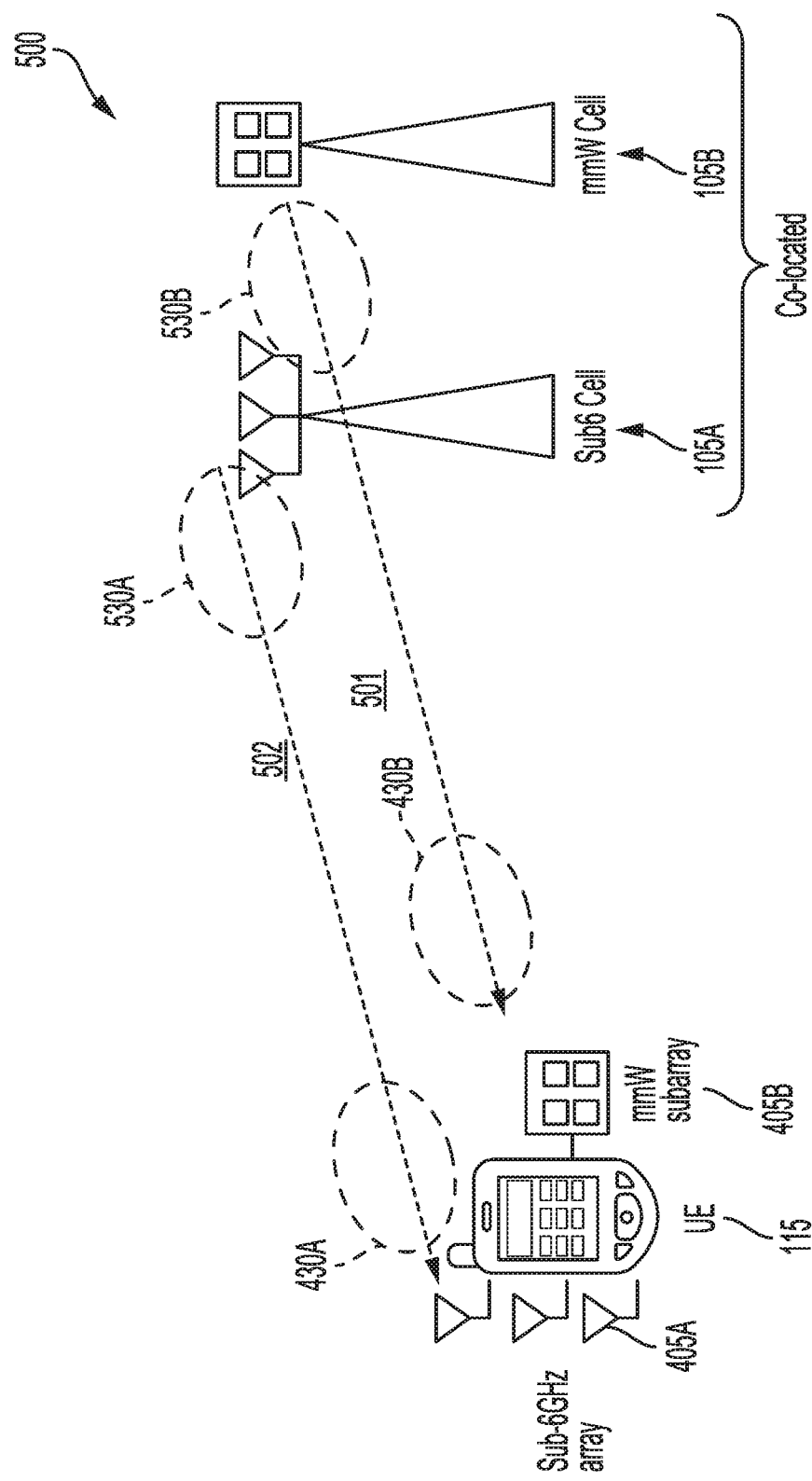

FIGS. 5A-5C illustrate example procedures for coordination between a UE 115 and base station 105 for determining cross-band QCL beams. In FIG. 5A, a UE 115 identifies a downlink signal 501 on a mmW frequency band sent by a mmW base station 105B on a transmission beam 530B that results in a highly directional beam as received at the UE 115. The highly directional nature of the signal 501 may be identified if the received analog beam 430B captures significant power compared to remaining analog beams from antenna array 405B. Based on the highly directional nature of the received signal 501, the UE 115 may determine that the analog beam 430B on which the signal 501 is received is suitable for determining a cross-band QCL digital beam associated with a sub-6 antenna array 405A.

In response to identification of the highly directional analog beam transmission 501, the UE 115 may request a sub-6 base station 105A to send a training signal on the sub-6 band with a digital downlink beam that most closely matches the analog downlink beam 530B used by the mmW base station 105B. As seen in FIG. 5B, the co-located base stations 105 may coordinate to determine a digital transmission beam 530A from base station 105A that has the same peak beam direction and closest beam pattern compared to the analog beam 530B used by base station 105B for transmission of downlink signal 501 to the UE 115. Accordingly, both downlink signals 501 and 502 from the mmW base station 105B and sub-6 base station 105A will arrive at the UE 115 having similar angles of arrival to assist the UE 115 in beam training procedures.

As seen in FIG. 5C, having received the highly directional downlink signal 502, the UE 115 may compute a receive digital beam 430A on the sub-6 band having a highest receive power or receive power above a threshold. For example, the receive digital beam 430A may be computed based on phased array beam steering with the steered direction matching the angle of arrival of the signal 502 on the sub-6 band. The receive beam 430A having greatest receive power relative to other beams or power above a threshold may be designated as the most ideal beam for receiving signals on the sub-6 frequency band from base station 105B. The UE 115 can then record or designate the receive analog beam 430B on the mmW band and the receive digital beam 430A on the sub-6 band as cross-band QCL beams. The UE 115 can similarly repeatedly perform the beam training procedures in coordination with base station 105 to map remaining beams at the UE 115.

The coordinated training procedures between UE 115 and base stations 105 described with respect to FIGS. 5A-5C ensures that the transmission beams 530A and 530B from the base stations 105 have similar transmission radiation pattern for the sub-6 and mmW bands. In some instances, however, the received radiation patterns at the UE 115 may differ for sub-6 and mmW frequency bands depending on the propagation environment. Accordingly, the UE 115 may repeat the operations described in FIGS. 5A-5C in coordination with other base stations (not shown) or different base station beams. The results from performing cross-band QCL mapping using different base stations or transmission beams may be used to confirm or determine an average cross-band QCL mapping for the beams at the UE 115. For example, if the resulting cross-band QCL pairings are independent of which base station 105 or which particular transmission beam is used, the UE 115 may have more confidence that the pairing is not a function of channel conditions and accurately captures the UE receive beam shape alignment across the sub-6 and mmW frequency bands.

Although the cross-band QCL mapping procedures described in the examples above are in reference to determining cross-band QCL digital beams in a sub-6 band based on corresponding analog beams in a mmW band, other bands, beam types, procedures, and factors are within the scope of the present disclosure. For example, the operations described above for cross-band QCL determination may be used for band combinations other than sub-6 or mmW frequency bands. The operations described above may also be used between beam sets having the same type, such as between two analog beam sets (e.g., an analog beam set on 28 GHz with cross-band QCL mapping to an analog beam set on 60 GHz). The operations described above may also be applied to determining cross-band QCL mapping for both transmission beams as well as receive beams using similar techniques as disclosed herein. Further, the operations described above with respect to FIGS. 5A-5C, for example, may be applied by first connecting to a sub-6 base station 105A and then requesting the co-located mmW base station 105B to send training signals for determining cross-band QCL analog beams based on the initially received sub-6 beams.

Still further, the operations described above may be repeated upon changes in environment or physical form-factor changes to the wireless device, for example. In some instances, for example, a UE 115 may have variable form-factor configurations such as bendable phones or folding laptops. Here, the UE 115 may index the cross-band QCL pairings for the current form-factor configuration and then repeat the operations for determining cross-band QCL mapping if the configuration changes. In some cases, the UE 115 may use sensor information, or perform self-calibration, to identify the form-factor configuration at the UE 115. Self-calibration may involve assistance from the network by receiving dummy grants to allow the UE to transmit from some resources while receiving the same signal on other signals.

Figure 6A:
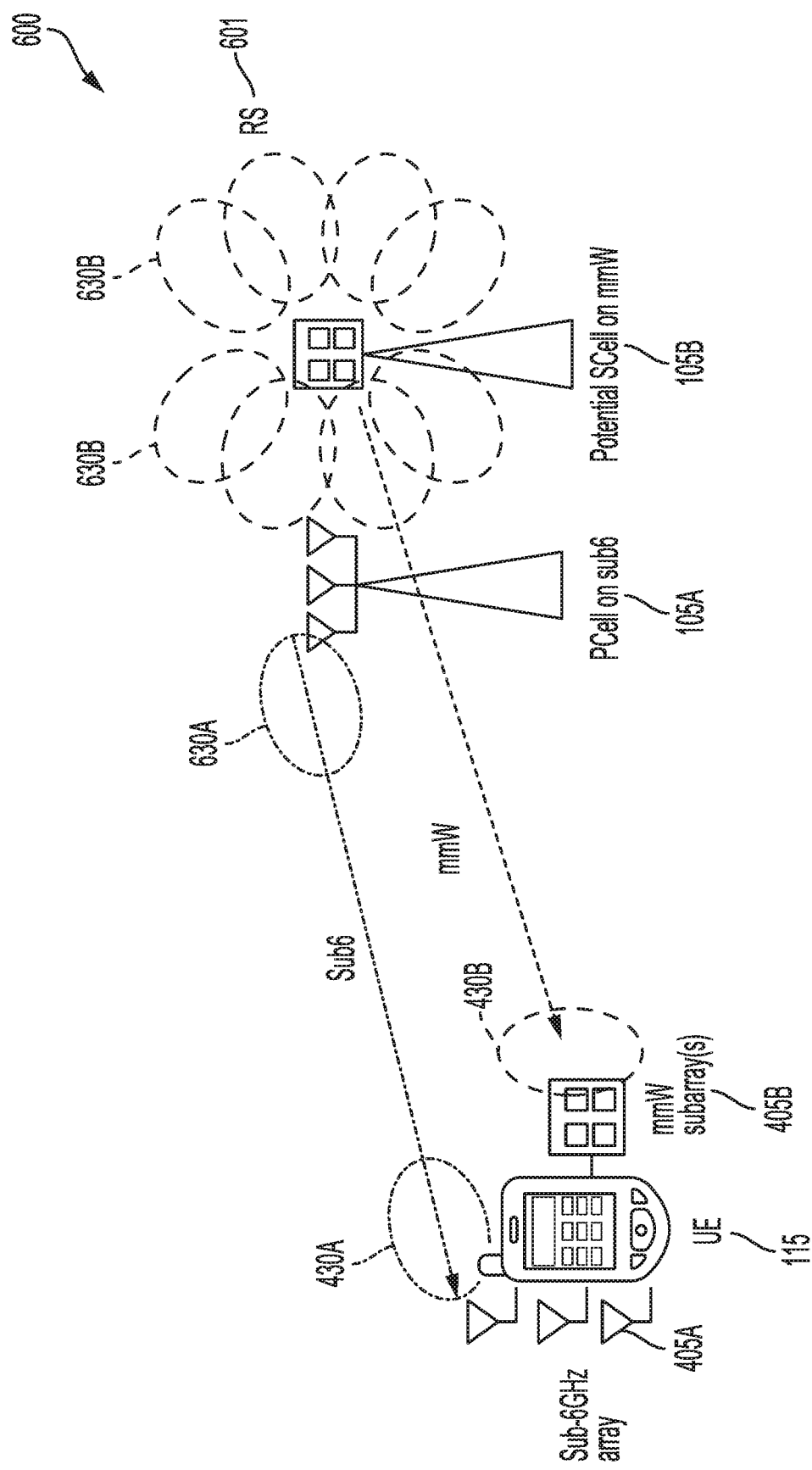
FIGS. 6A-6B illustrate operations conducted in an example system for initial beam selection based on cross-band QCL determination in accordance with aspects of the present disclosure.
Figure 6B:
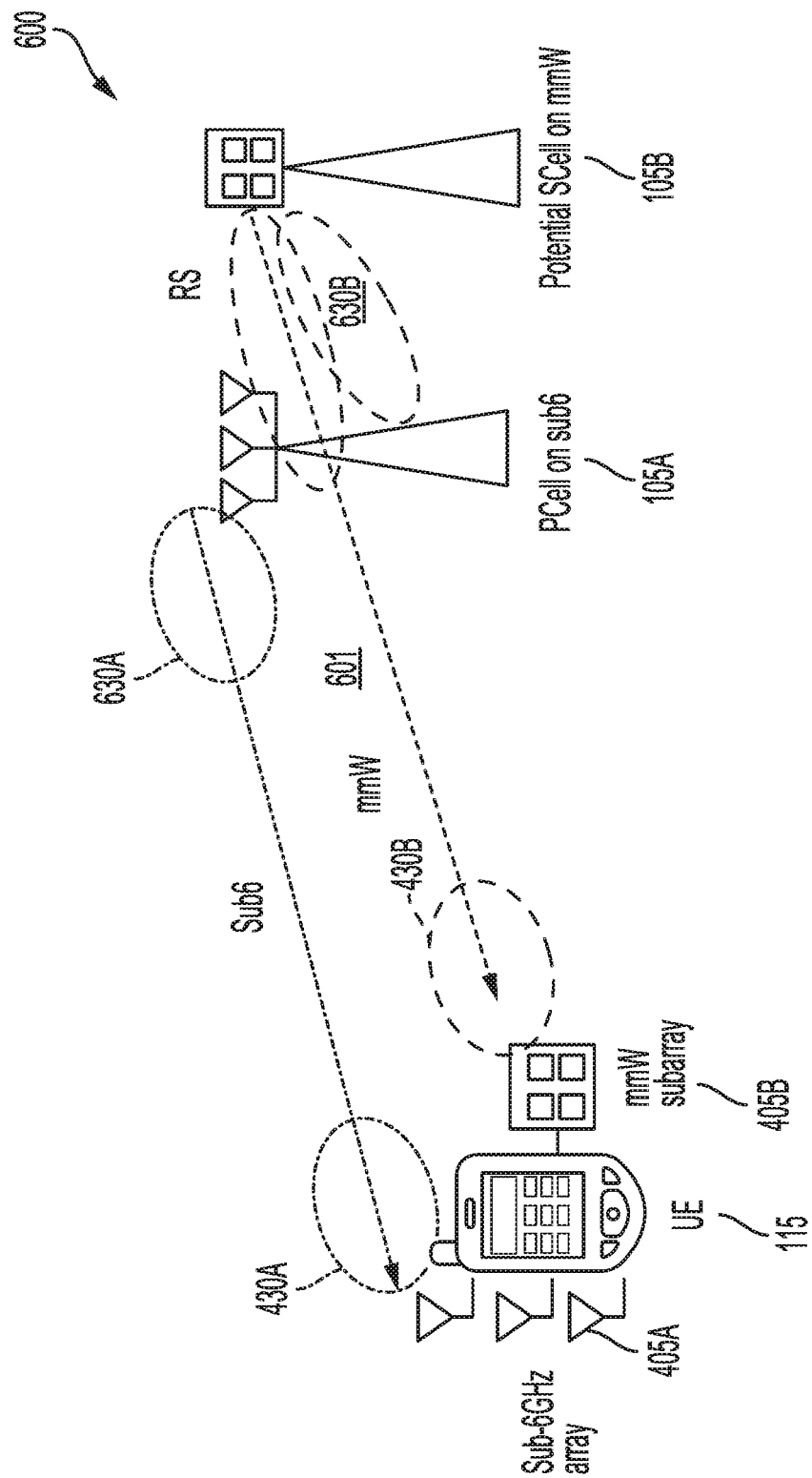

By determining cross-band QCL mapping for different beam sets, a wireless device may avoid having to perform unnecessary operations associated with beam training or uncertainty as to location of a receiving device. FIGS. 6A-6B illustrate an example application of cross-band QCL determination for improving communication efficiency during initial beam selection. As illustrated in FIG. 6, a UE 115 is connected to a primary cell (PCell) 105A on sub-6 frequency band and searches for a potential secondary cell (SCell) 105B on a mmW band for carrier aggregation. A potential SCell 105B is co-located with the PCell 105A and sends reference signals (RS) 601, e.g., SSB/CSI-RS, on different beams 630A for initial beam selection by the UE 115. As shown in FIG. 6, without knowledge of the location of the UE 115, the SCell 105B may need to send reference signals 601 in all directions across multiple beams 630B, and the full beam sweep procedure may require high overhead. Likewise, without a cross-band QCL determination of its mmW beams 430B, the UE 115 may not have knowledge in this instance of the mmW reference signal 601 arrival angle and may thus need to simultaneously turn on multiple receive beams 430B in all directions to correctly receive the mmW reference signal 601. Further, the UE 115 may be beyond the range of reference signal 601 sent via beam sweep procedures.

In the illustrated example, if the UE 115 and PCell 105A have previously identified, via beam management procedures, an ideal receive beam 430A and transmit beam 630A for communications between the PCell 105A and UE 115 on the sub-6 band, the PCell 105A may coordinate with the co-located SCell 105B to aid in beam selection at the UE 115. In particular, as seen in FIG. 6B, the SCell 105B may send reference signals via beam(s) 630B in a direction similar to the direction of the sub-6 beam 630A used by the PCell 105A for transmissions to the UE 115. In some instances, the PCell 105A may send an instruction to the UE 115 to measure the reference signals 601 of the SCell 105B along mmW beam 430B having similar direction as the receive beam 430A used by the UE 115 for receiving communications from the PCell 105A on the sub-6 band. The cross-band QCL aided beam selection may reduce the beam sweep overhead at the SCell 105B, since the SCell 105B may no longer need to transmit reference signals 601 across all beams in all directions. The UE 115 may benefit with power savings due to avoiding using all receive beams 430B on the mmW frequency band. Further, the range of the mmW transmissions by the SCell 105B may be increased by using narrower beams 630B having a shared direction with the beams 630A and 430A of the PCell 105A communications on the sub-6 band.

In the illustrated example, various options for signaling the UE 115 to measure reference signals 601 via particular beams 430B in the mmW band are within the scope of the present disclosure. In one option, the PCell 105A may send an indicator to instruct the UE 115 to measure reference signals 601 on the mmW band using a beam 430B having direction similar to the current receive beam 430A used for receiving transmissions on the sub-6 band from the PCell 105A. The indicator may be sent in reference signal measurement configuration messages to the UE 115, for example. The UE 115 may then determine the appropriate mmW receive beam(s) based on determination of cross-band QCL beams as described above with reference to FIGS. 4, 5A-5C.

In some instances, the PCell 105A may signal a receive beam identification (ID) on the sub-6 band to the UE 115 and instruct the UE 115 to measure reference signals 601 on the mmW band using beam(s) having a direction similar to the receive beam ID. The receive beam ID may be an identification assigned to a particular beam at the UE 115 to distinguish the beam from other possible beams. As used in the present disclosure, a receive beam ID may include different identification forms for particular beams. For example, a synchronization signal block (SSB) ID may be associated with each SSB transmitted by a base station on a particular beam. The base station may transmit one SSB on each beam, and each SSB may be associated with a unique SSB ID. Accordingly, the SSB ID may be used as one form of indicating UE beam ID under these circumstances, e.g. UE should use the same beam as that for receiving the SSB with the indicated SSB ID. Similarly, channel state information reference signal (CSI-RS) resource indicator or ID and sounding reference signal (SRS) resource ID may also be used as a form of indicating the UE beam ID in some instances, e.g. UE should use the same beam as that for receiving the CSI-RS with indicated CSI-RS ID, or as that for transmitting SRS with indicated SRS resource ID. Returning to the illustrated example, the PCell 105A may request the UE 115 to report the beam ID of the ideal beam 430B used by the UE 115 to receive sub-6 communications from the PCell 105A. In response, the PCell 105A may send this receive beam ID to the UE 115 in a reference signal measurement configuration when the PCell 105A instructs the UE 115 to measure mmW reference signals on a beam based on the receive beam ID.

In certain instances, the PCell 105A may alternatively or additionally signal a transmit beam ID (e.g., in reference signal measurement configuration) on the sub-6 band to the UE 115 and instruct the UE 115 to measure reference signals 601 on the mmW band using beam(s) having a direction similar to the ideal UE receive beam for receiving communications from PCell 105A, where the ideal UE receive beam is the receive beam corresponding to the transmit beam ID. In the illustrated example, the transmit beam ID is an identification of the particular transmit beam 630A used by the PCell 105A to communicate with the UE 115 on the sub-6 band. Since the UE 115 has previously identified the ideal beam(s) for receiving sub-6 communications from the PCell 105A, the UE 115 may determine that the receive beam that corresponds to the transmit beam ID is receive beam 430A. The UE 115 may then identify a mmW receive beam 430B that is cross-band QCL with respect to receive beam 430A and use the receive beam 430B for receiving mmW reference signals 601 from SCell 105B. In addition, besides the indicator identifying the cross-band QCLed beam, the PCell may also signal the source and target bands, e.g. sub-6 and mmW, where the indicated reference beam and its respective cross-band QCL beam are located.

Figure 7:
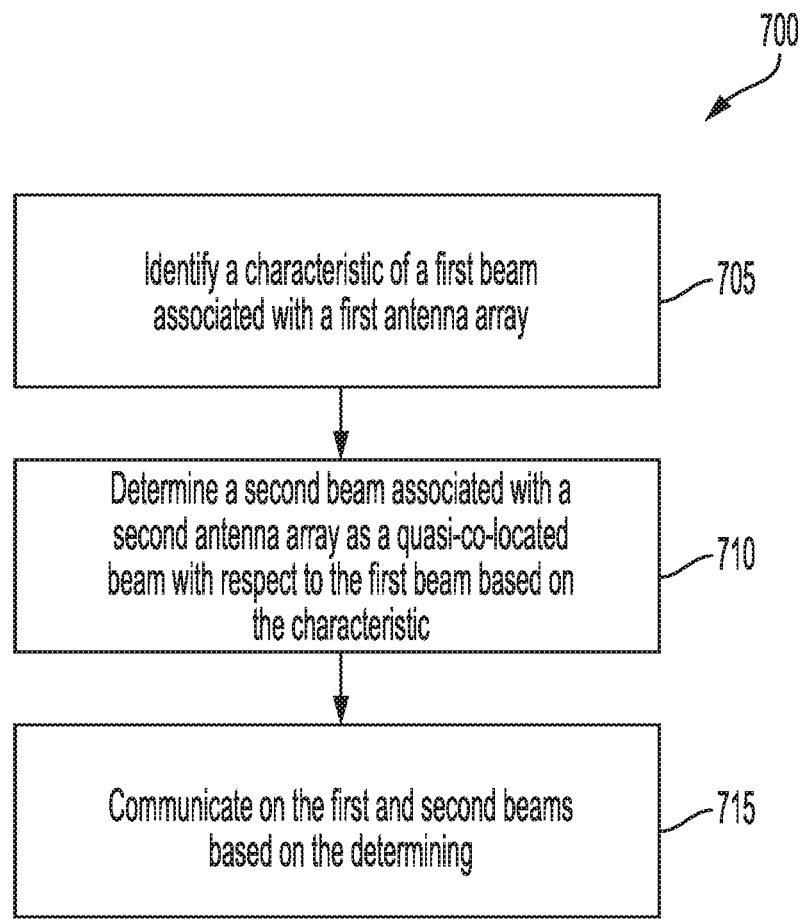
FIGS. 7 and 8 illustrate methods for cross-band QCL determination in accordance with aspects of the present disclosure.

FIG. 7 shows a flowchart illustrating a process 700 for determining cross-band QCL mapping in accordance with various aspects of the present disclosure. The operations of process 700 may be implemented by a wireless device such as a base station or its components, or a user equipment or its components, as described with reference to FIGS. 1 and 9. For example, the operations of process 700 may be performed by the processor 940 or 980, either alone or in combination with other components, as described herein. In some examples, the base station 105 or UE 115 may execute a set of codes to control the functional elements of the device to perform the functions described below. Additionally or alternatively, the base station 105 or UE 115 may perform aspects of the functions described below using special-purpose hardware.

At 705, the wireless device identifies a characteristic of a first beam associated with a first antenna array. At 710, the wireless device determines a second beam associated with a second antenna array as a quasi-co-located beam with respect to the first beam based on the characteristic. At 715, the wireless device communicates on the first and second beams based on the determining.

Figure 8:
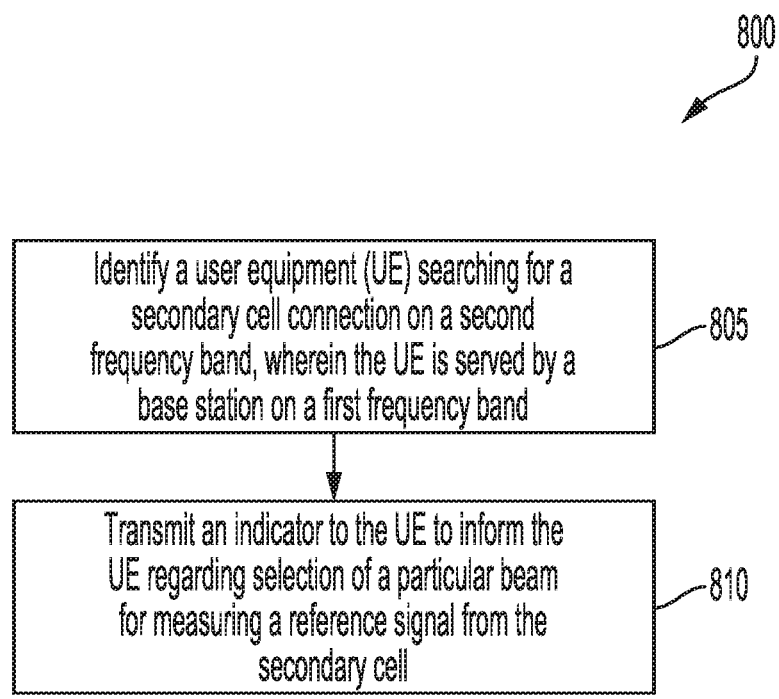

FIG. 8 shows a flowchart illustrating a process 800 performed by a base station for assisting a user equipment with initial beam selection based on a cross-band QCL mapping in accordance with various aspects of the present disclosure. The operations of process 800 may be implemented by a base station or its components, as described with reference to FIGS. 1 and 9. For example, the operations of process 800 may be performed by the processor 940, either alone or in combination with other components, as described herein. In some examples, the base station 105 may execute a set of codes to control the functional elements of the device to perform the functions described below. Additionally or alternatively, the base station 105 may perform aspects of the functions described below using special-purpose hardware.

At 805, the base station 105 identifies a user equipment (UE) searching for a secondary cell connection on a second frequency band, wherein the UE is served by a base station on a first frequency band. At 810, the base station 105 transmits an indicator to the UE to inform the UE regarding selection of a particular beam for measuring a reference signal from the secondary cell. In some instances, the indicator may comprise an instruction to measure the reference signal in a direction substantially aligned with a receive beam used to receive transmissions from the base station on the first frequency band, a beam identification number of a receive beam used to receive transmissions from the base station on the first frequency band, or a beam identification number of a transmit beam used to send transmissions from the base station to the UE on the first frequency band.

Figure 9:
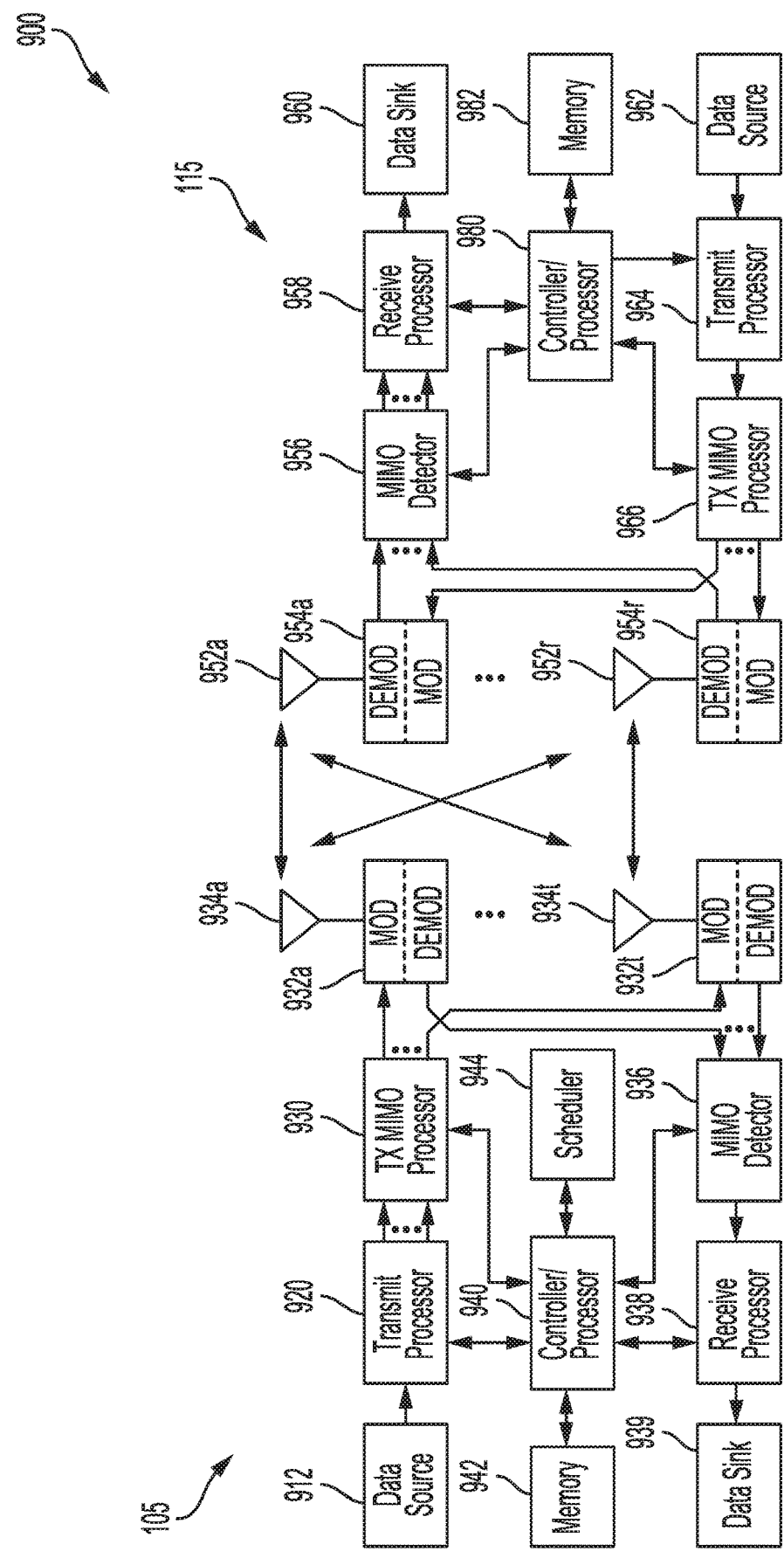
FIG. 9 is a block diagram illustrating a design of a base station/eNB and a UE configured according to one aspect of the present disclosure.

FIG. 9 shows a block diagram 900 of a design of a base station/eNB 105 and a UE 115, which may be one of the base stations/eNBs and one of the UEs in FIG. 1. At the eNB 105, a transmit processor 920 may receive data from a data source 912 and control information from a controller/processor 940. The control information may be for various control channels such as the PBCH, PCFICH, PHICH, PDCCH, EPDCCH, MPDCCH etc. The data may be for the PDSCH, etc. The transmit processor 920 may process (e.g., encode and symbol map) the data and control information to obtain data symbols and control symbols, respectively. The transmit processor 920 may also generate reference symbols, e.g., for the PSS, SSS, and cell-specific reference signal. A transmit (TX) multiple-input multiple-output (MIMO) processor 930 may perform spatial processing (e.g., precoding) on the data symbols, the control symbols, and/or the reference symbols, if applicable, and may provide output symbol streams to the modulators (MODs) 932a through 932t. Each modulator 932 may process a respective output symbol stream (e.g., for OFDM, etc.) to obtain an output sample stream. Each modulator 932 may further process (e.g., convert to analog, amplify, filter, and upconvert) the output sample stream to obtain a downlink signal. Downlink signals from modulators 932a through 932t may be transmitted via the antennas 934a through 934t, respectively. The downlink signals may include training signals or a highly direction signal to assist the UE 115 to determine cross-band QCL beams, such as those described with reference to FIGS. 5A-5C, or the indicator to the UE 115 to inform the UE 115 regarding selection of beam(s) for measuring reference signals, as described with reference to FIG. 8. The antennas 934a through 934t may, for example, comprise multiple antenna arrays, where each antenna array may be used for communications on different frequency bands, as described herein. The beams associated with a first antenna array may be mapped to beams associated with a second antenna array based on cross-band QCL determination operations described above with reference to FIGS. 2-8, for example.

At the UE 115, the antennas 952a through 952r may receive the downlink signals from the eNB 105 and may provide received signals to the demodulators (DEMODs) 954a through 954r, respectively. Each demodulator 954 may condition (e.g., filter, amplify, downconvert, and digitize) a respective received signal to obtain input samples. Each demodulator 954 may further process the input samples (e.g., for OFDM, etc.) to obtain received symbols. A MIMO detector 956 may obtain received symbols from all the demodulators 954a through 954r, perform MIMO detection on the received symbols if applicable, and provide detected symbols. A receive processor 958 may process (e.g., demodulate, deinterleave, and decode) the detected symbols, provide decoded data for the UE 115 to a data sink 960, and provide decoded control information to a controller/processor 980.

On the uplink, at the UE 115, a transmit processor 964 may receive and process data (e.g., for the PUSCH) from a data source 962 and control information (e.g., for the PUCCH) from the controller/processor 980. The transmit processor 964 may also generate reference symbols for a reference signal. The symbols from the transmit processor 964 may be precoded by a TX MIMO processor 966 if applicable, further processed by the modulators 954a through 954r (e.g., for SC-FDM, etc.), and transmitted to the eNB 105. The transmissions to the eNB 105 may include requests for training signals to assist in identifying cross-band QCL beams, such as described in reference to FIGS. 5A-5C, for example, or reporting a receive beam ID to the eNB 105 for assistance with initial beam selection, as described with reference to FIGS. 6A-6B. At the eNB 105, the uplink signals from the UE 115 may be received by the antennas 934, processed by the demodulators 932, detected by a MIMO detector 936 if applicable, and further processed by a receive processor 938 to obtain decoded data and control information sent by the UE 115. The processor 938 may provide the decoded data to a data sink 939 and the decoded control information to the controller/processor 940.

The controllers/processors 940 and 980 may direct the operation at the eNB 105 and the UE 115, respectively. The controller/processor 940 and/or other processors and modules at the eNB 105 may perform or direct the execution of the functional blocks illustrated in FIG. 7-8, and/or other various processes for the techniques described herein. The controllers/processor 980 and/or other processors and modules at the UE 115 may also perform or direct the execution of the functional blocks illustrated in FIG. 7, and/or other processes for the techniques described herein. The memories 942 and 982 may store data and program codes for the eNB 105 and the UE 115, respectively. For example, memory 942 may store instructions that, when performed by the processor 940 or other processors depicted in FIG. 9, cause the base station 105 to perform operations described with respect to FIGS. 7-8. Similarly, memory 982 may store instructions that, when performed by processor 980 or other processors depicted in FIG. 9 cause the UE 115 to perform operations described with respect to FIG. 7. A scheduler 944 may schedule UEs for data transmission on the downlink and/or uplink.

While blocks in FIG. 9 are illustrated as distinct components, the functions described above with respect to the blocks may be implemented in a single hardware, software, firmware, or combination component or in various combinations of components. For example, the functions described with respect to the transmit processor 920, the receive processor 938, or the TX MIMO processor 930 may be performed by or under the control of processor 940.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   identifying a characteristic of a first beam associated with a first antenna array wherein the characteristic comprises at least a radiation pattern;
   determining a second beam associated with a second antenna array as a quasi-co-located beam with respect to the first beam based on the characteristic, wherein the determining comprises:
      adjusting beam weights of the second beam to substantially match the radiation pattern of the first beam; and designating the second beam as a cross-band quasi-co-located beam with respect to the first beam; and
communicating on the first and second beams based on the determining.

2. The method of claim 1, wherein the first antenna array is associated with analog beams and the second antenna array is associated with digital beams.

3. The method of claim 1, wherein the first antenna array is associated with a first frequency band and the second antenna array is associated with a second frequency band.

4. The method of claim 1, wherein the characteristic further comprises at least one of, a peak beam direction or a received power of the first beam.

5. The method of claim 4, wherein the determining further comprises:
determining the second beam having a phased array beam steering with a steered direction most aligned with the peak beam direction of the first beam relative to other beams associated with the second antenna array; and
designating the second beam as a cross-band quasi-co-located beam with respect to the first beam.

6. The method of claim 4, wherein the received power is higher than received power of other beams associated with the first antenna array and higher than a threshold power.

7. The method of claim 6, wherein the determining further comprises:
sending a request on a first frequency band to a base station for a training signal on a second frequency band with a second frequency band transmit beam matching a beam pattern and peak beam direction of a first frequency band transmit beam;
receiving the training signal;
determining the second beam having a phased array beam steering with a steered direction such that a received power of the second beam is higher than other beams associated with the second antenna array; and
designating the second beam as a cross-band quasi-co-located beam with respect to the first beam.

8. The method of claim 7, further comprising iteratively sending requests to at least one different base station for training signals to determine the second beam.

9. The method of claim 1, further comprising determining, for each beam associated with the first antenna array, at least one quasi-co-located beam associated with the second antenna array based on a characteristic of each beam.

10. The method of claim 9, further comprising:
identifying a change in form factor of a wireless device containing the first and second antenna arrays; and
determining, for at least one beam associated with the first antenna array, at least one different quasi-co-located beam associated with the second antenna array in response to the change in form factor.

11. The method of claim 1, further comprising:
receiving an indicator to measure a reference signal via a quasi-co-located beam with respect to the first beam; and
measuring the reference signal on the second beam based on the indicator.

12. The method of claim 11, wherein the first beam is a beam having received power that is higher than received power of other beams associated with the first antenna array.

13. The method of claim 1, further comprising:
receiving a request to report a beam identification of the first beam;
reporting the beam identification of the first beam; and
receiving an indicator to measure a reference signal on a beam quasi-co-located with respect to the first beam having the beam identification.

14. The method of claim 13, wherein the beam identification comprises an identification number of a synchronization signal block (SSB), a channel state information reference signal (CSI-RS), or a sounding reference signal (SRS).

15. The method of claim 1, further comprising:
receiving a transmit beam identification indicating a beam used for transmission on a frequency band associated with the first antenna array;
identifying the second beam associated with the second antenna array and quasi-co-located with respect to a receive beam corresponding to the transmit beam identification; and
measuring a reference signal using the second beam.

16. An apparatus for wireless communications, comprising:
a processor;
memory in electronic communication with the processor; and
instructions stored in the memory and operable, when executed by the processor, to cause the apparatus to:
identify a characteristic of a first beam associated with a first antenna array wherein the characteristic comprises at least a radiation pattern;
determine a second beam associated with a second antenna array as a quasi-co-located beam with respect to the first beam based on the characteristic, wherein the determining comprises:
adjusting beam weights of the second beam to substantially match the radiation pattern of the first beam; and
designating the second beam as a cross-band quasi-co-located beam with respect to the first beam; and
communicate on the first and second beams based on the determining.

17. The apparatus of claim 16, wherein the first antenna array is associated with analog beams and the second antenna array is associated with digital beams.

18. The apparatus of claim 16, wherein the first antenna array is associated with a first frequency band and the second antenna array is associated with a second frequency band.

19. The apparatus of claim 16, wherein the characteristic further comprises at least one of a radiation pattern, a peak beam direction or a received power of the first beam.

20. The apparatus of claim 19, wherein the determining further comprises:
determining the second beam having a phased array beam steering with a steered direction most aligned with the peak beam direction of the first beam relative to other beams associated with the second antenna array; and
designating the second beam as a cross-band quasi-co-located beam with respect to the first beam.

21. The apparatus of claim 19, wherein the received power is higher than received power of other beams associated with the first antenna array and higher than a threshold power.

22. The apparatus of claim 21, wherein the instructions are further operable, when executed by the processor, to cause the apparatus to:
send a request on a first frequency band to a base station for a training signal on a second frequency band with a second frequency band transmit beam matching a beam pattern and peak beam direction of a first frequency band transmit beam;

receive the training signal;

determine the second beam having a phased array beam steering with a steered direction such that a received power of the second beam is higher than other beams associated with the second antenna array; and designate the second beam as a cross-band quasi-co-located beam with respect to the first beam.

23. The apparatus of claim 22 wherein the instructions are further operable, when executed by the processor, to cause the apparatus to send requests to at least one different base station for training signals to determine the second beam.

24. The apparatus of claim 16, wherein the instructions are further operable, when executed by the processor, to cause the apparatus to:

receive an indicator to measure a reference signal via a quasi-co-located beam with respect to the first beam; and measure the reference signal on the second beam based on the indicator.

25. The apparatus of claim 24, wherein the first beam is a beam having received power that is higher than received power of other beams associated with the first antenna array.

26. The apparatus of claim 16, wherein the instructions are further operable, when executed by the processor, to cause the apparatus to:

receive a request to report a beam identification of the first beam;

reporting the beam identification of the first beam; and receive an indicator to measure a reference signal on a beam quasi-co-located with respect to the first beam having the beam identification.

27. The apparatus of claim 26, wherein the beam identification comprises an identification number of a synchronization signal block (SSB), a channel state information reference signal (CSI-RS), or a sounding reference signal (SRS).

28. An apparatus for wireless communications, comprising:

means for identifying a characteristic of a first beam associated with a first antenna array, wherein the characteristic comprises at least a radiation pattern;

means for determining a second beam associated with a second antenna array as a quasi-co-located beam with respect to the first beam based on the characteristic, wherein the means for determining further comprises:

means for adjusting beam weights of the second beam to substantially match the radiation pattern of the first beam; and means for designating the second beam as a cross-band quasi-co-located beam with respect to the first beam; and means for communicating on the first and second beams based on the determining.

* * * * *